US011272348B2

(12) United States Patent
Higuchi

(10) Patent No.: US 11,272,348 B2
(45) Date of Patent: Mar. 8, 2022

(54) RADIO COMMUNICATION APPARATUS AND COMMUNICATION SYSTEM

(71) Applicant: RENESAS ELECTRONICS CORPORATION, Tokyo (JP)

(72) Inventor: Mitsuhiko Higuchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 34 days.

(21) Appl. No.: 16/850,861

(22) Filed: Apr. 16, 2020

(65) Prior Publication Data

US 2020/0382937 A1 Dec. 3, 2020

(30) Foreign Application Priority Data

May 28, 2019 (JP) .............................. JP2019-099513

(51) Int. Cl.
| | |
|---|---|
| *H04W 4/00* | (2018.01) |
| *H04W 8/00* | (2009.01) |
| *H04W 76/14* | (2018.01) |
| *G06Q 30/02* | (2012.01) |
| *H04W 48/18* | (2009.01) |
| *H04W 4/06* | (2009.01) |
| *H04W 4/80* | (2018.01) |

(52) U.S. Cl.
CPC ........ *H04W 8/005* (2013.01); *G06Q 30/0251* (2013.01); *H04W 4/06* (2013.01); *H04W 4/80* (2018.02); *H04W 48/18* (2013.01); *H04W 76/14* (2018.02)

(58) Field of Classification Search
CPC ....... H04W 8/005; H04W 76/14; H04W 4/06; H04W 4/80; H04W 8/00; G06Q 30/0251
USPC .................................................. 370/329, 412
See application file for complete search history.

(56) References Cited

U.S. PATENT DOCUMENTS

| | | | | |
|---|---|---|---|---|
| 9,215,075 | B1 * | 12/2015 | Poltorak ................. | H04L 63/04 |
| 10,784,993 | B1 * | 9/2020 | Batra ..................... | H04L 1/1887 |
| 2011/0276636 | A1 * | 11/2011 | Cheng .................... | H04L 69/14 |
| | | | | 709/206 |

(Continued)

FOREIGN PATENT DOCUMENTS

JP 6060299 B1 1/2017

*Primary Examiner* — Marceau Milord
(74) *Attorney, Agent, or Firm* — McDermott Will & Emery LLP

(57) ABSTRACT

In the conventional wireless communication device, the message propagation path becomes complicated and the message arrival takes a long time. According to one embodiment, the wireless communication device includes an advertising communication control unit that performs broadcast communication with a plurality of unspecified other device, and a connection communication control unit that performs one-to-one communication with a preset specific other device, and performs transmission and reception of a message using a connection communication control unit with another device in a connection cluster that can communicate with the connection communication control unit, and performs transmission and reception of a message using an advertising communication control unit by a wireless communication device permitted in the connection cluster with another device outside the connection cluster.

15 Claims, 14 Drawing Sheets

(56) References Cited

U.S. PATENT DOCUMENTS

| | | | | |
|---|---|---|---|---|
| 2013/0040573 A1* | 2/2013 | Hillyard | ............... | H04W 8/005 |
| | | | | 455/41.2 |
| 2013/0040574 A1* | 2/2013 | Hillyard | ............... | H04W 8/005 |
| | | | | 455/41.2 |
| 2014/0098758 A1* | 4/2014 | Cheng | .................... | H04W 4/24 |
| | | | | 370/329 |
| 2015/0039752 A1* | 2/2015 | Hague | .................. | H04L 12/403 |
| | | | | 709/224 |
| 2017/0034856 A1* | 2/2017 | Takeuchi | .............. | H04L 12/189 |
| 2017/0230810 A1* | 8/2017 | Banerjea | ................. | H04W 4/80 |
| 2017/0265046 A1* | 9/2017 | Chen | ....................... | H04W 4/06 |
| 2018/0139683 A1* | 5/2018 | Kwon | .................... | H04L 45/20 |
| 2018/0198752 A1* | 7/2018 | Zhang | ................. | H04W 12/02 |
| 2020/0252162 A1* | 8/2020 | Denboer | ................ | H04L 1/189 |

* cited by examiner

ADVERTISING OPERATION = ON

COMPARATIVE EXAMPLE

FIRST EMBODIMENT

● ADVERTISING OPERATION = ON

ADVERTISING OPERATION = ON

COMPARATIVE EXAMPLE

SECOND EMBODIMENT

ADVERTISING OPERATION = ON

RADIO COMMUNICATION APPARATUS AND COMMUNICATION SYSTEM

CROSS-REFERENCE TO RELATED APPLICATIONS

The disclosure of Japanese Patent Application No. 2019-099513 filed on May 28, 2019 including the specification, drawings and abstract is incorporated herein by reference in its entirety.

BACKGROUND

The present invention relates to a wireless communication device and a communication system, for example, the present invention relates to a wireless communication device and a communication system for constructing a mesh-shaped network for transmitting and receiving data through a wireless path, and realizing many-to-many data communication.

The Background of the Invention

In recent years, a technology has been proposed in which a large number of wireless communication device are connected in meshes, and data is transmitted to a remote point by using wireless communication. One such technology is the BLE (Bluetooth® Low Energy) technology, which is a type of digital wireless communication standard. The BLE technology is a technology for short-range communication, and one-to-many unidirectional broadcast communication and one-to-one directional communication are defined as basic communication forms.

In recent years, specifications for constructing a many-to-many wireless-mesh network using the BLE technology have been developed by Bluetooth SIG. This specification is a specification in which data is propagated among a large number of device by repeating relaying of data by respective device corresponding to the BLE technology. This allows communication with a device that is out of wireless coverage and is not capable of direct communication.

There are disclosed techniques listed below.
[Patent Document 1] Japanese Pat. No. 6,060,299

Lighting systems using the BLE technology are disclosed in Patent Document 1. The lighting system according to Patent Document 1 comprises a terminal device group comprising a plurality of terminals device, one of which is a first lighting device having a light source and one of which is a first control device for generating first data for controlling said first lighting device, said terminal device group comprising nodes of respective terminals device, neighboring terminals device constituting a network connected by Bluetooth® connections, said first control device transmitting said first data to said first lighting device via at least a connection wherein said first control device is peripheral and other connection wherein said first lighting device is central or peripheral.

SUMMARY

In the lighting systems described in Patent Document 1, each device establishes connection relationships and propagates data by sequentially repeating one-to-one communication through connection operations. For this problem, in the lighting system of Patent Document 1, the time required for data to propagate through the wireless mesh network becomes longer as compared with the advertising operation in which data can be broadcast in a one-to-many manner. Especially, when the scale of the mesh network is large, the number of times of communication increases, so that the decrease in the propagation speed of data becomes more remarkable.

Other objects and novel features will become apparent from the description of this specification and the accompanying drawings.

According to one embodiment, the wireless communication device includes an advertising communication control unit that performs broadcast communication with a plurality of unspecified other device and a connection communication control unit that performs one-to-one communication with a preset specific other device, and performs transmission and reception of a message using the connection communication control unit with another device in the connection cluster that can communicate with the connection communication control unit, and performs transmission and reception of a message using the advertising communication control unit by a device permitted in the connection cluster with another device outside the connection cluster.

According to the above-mentioned embodiment, a wireless communication device can be provided which performs communication while maintaining a higher communication speed by covering a wider communication range with a small number of channels.

DETAILED DESCRIPTION

Figure 1:
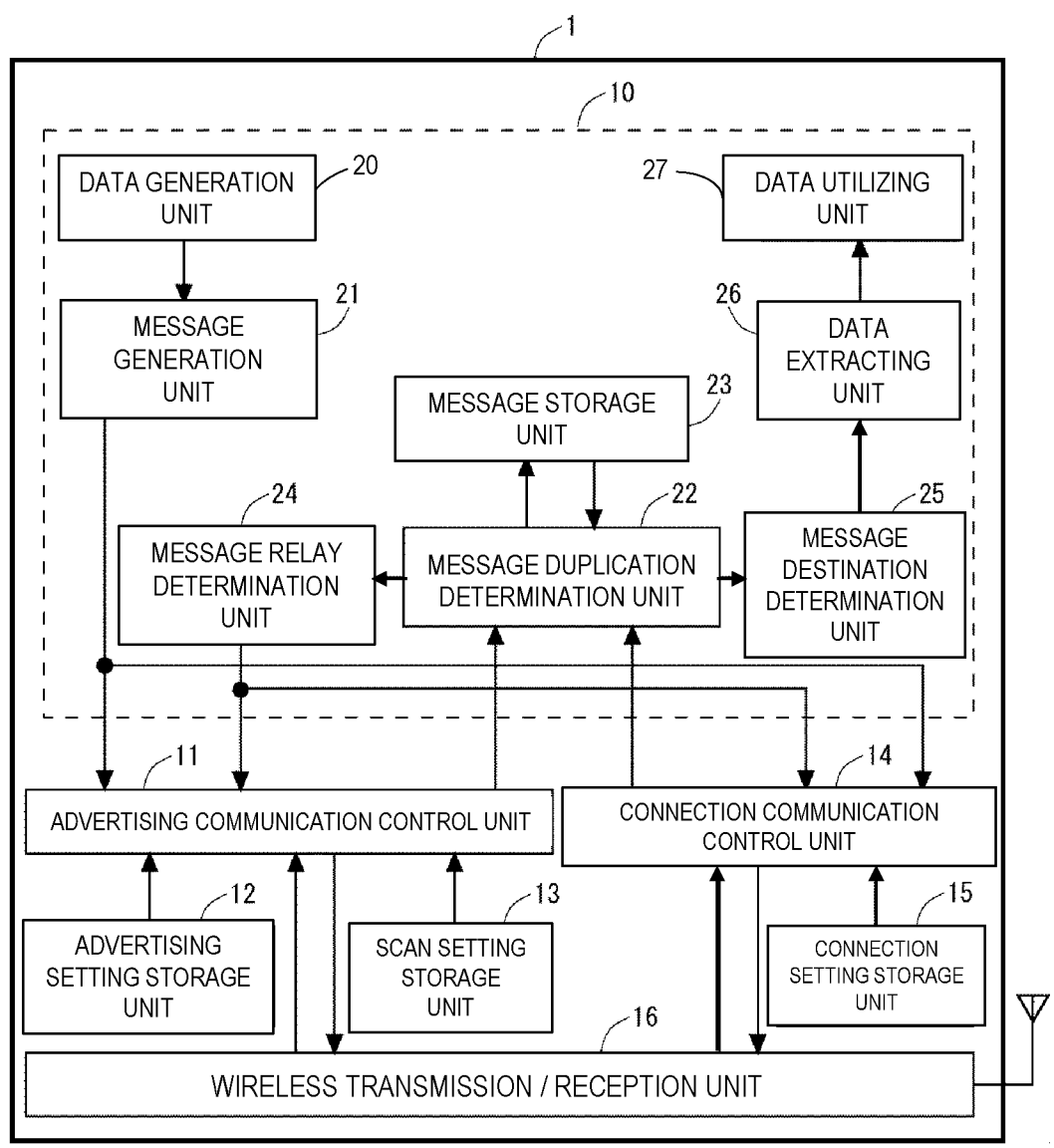
FIG. 1 is a diagram of a wireless communication device according to a first embodiment.

For clarity of explanation, the following description and drawings are appropriately omitted and simplified. In addition, each element described in the drawings as a functional block for performing various processes can be configured by a computer configured by a general-purpose information processing circuit such as a CPU and a memory, or a special-purpose circuit specialized in a specific information processing in terms of hardware, and is realized by a program loaded in a memory of the computer in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The programs may also be supplied to the computer by various types of transitory computer-readable transitory computer readable media. Examples of transitory computer-readable media include electrical signals, optical signals, and electromagnetic waves. The transitory computer readable medium may provide the program to the computer via wired or wireless communication paths, such as electrical wires and optical fibers.

FIG. 1 shows a wireless communication device 1 according to the first embodiment. The wireless communication device 1 shown in FIG. 1 is a part of a communication system which constitutes a mesh network together with a device having another similar configuration. Therefore, in order to uniquely identify a plurality of wireless communication device 1, unique device IDs for identifying respective device are assigned in the communication system. The wireless communication device 1 according to the first embodiment has a function of performing connection communication for communicating with other wireless communication device 1 on a one-to-one basis, and advertising communication for communicating with an unspecified number of other wireless communication device 1 in the communication system. In the communication system according to the first embodiment, a plurality of wireless communication device 1 constructing the communication system are classified into one of a plurality of connection clusters, and advertising communication is permitted for only one device in the connection clusters.

In the embodiment described below, it is assumed that the wireless communication device 1 performs wireless communication based on Bluetooth Low Energy (BLE) technology. In BLE technology, it is specified in the standard that 37 channels of 0ch to 36ch are allocated to connection communication and 3 channels of 37ch to 39ch are allocated to advertising communication. It should be noted that the channel utilization method and the network construction method applied in the wireless communication device 1 can be applied to various wireless communication technologies regardless of the BLE technology. Hereinafter, the configuration and operation of the wireless communication device 1 according to the first embodiment will be described in detail.

As shown in FIG. 1, the wireless communication device 1 according to the first embodiment includes a message processing unit 10, an advertising communication control unit 11, an advertising setting storage unit 12, a scan setting storage unit 13, a connection communication control unit 14, a connection setting storage unit 15, and a transmission and reception unit (e.g., a wireless transmission and reception unit 16).

The message processing unit 10 processes a message to be transmitted and received via the wireless transmission and reception unit 16. In addition, the message processing unit 10 switches the communication control unit used for transmitting and receiving messages in accordance with the settings in the communication system of the wireless communication device 1. More specifically, the message processing unit 10 transmits and receives messages to and from other device in the connection clusters that can communicate by the connection operation using the connection communication control unit 14. The message processing unit 10 transmits and receives the message to and from other devices outside the connection clusters using the advertising communication control unit when device is permitted to perform the advertising operation. The detailed configuration and operation of the message processing unit 10 will be described later.

The advertising communication control unit 11 performs an advertising operation and a scan operation via the wireless transmission and reception unit 16. In the advertising operation, messages are broadcast to a plurality of unspecified other device. In the scan operation, one of a plurality of other device receives messages broadcast.

The advertising setting storage unit 12 stores an advertising setting value for setting whether or not the advertising communication control unit performs an advertising operation. The advertising communication control unit 11 switches whether or not to perform the advertising operation based on the advertising setting value. The advertising setting is generated externally by the system administrator based on the configuration of the entire communication system, and is distributed to the wireless communication device 1 in the communication system when the communication system is configured.

The scan setting storage unit 13 stores a scan setting value for specifying a channel to be used when the advertising communication control unit 11 performs a scan operation. The advertising communication control unit 11 performs a scan operation using the channel described in the scan setting value. As will be described later in detail, the scan setting values are set so that any of the channels permitted for the scan operation does not overlap as much as possible in the wireless communication device 1 belonging to the same connection cluster. In the BLE technology, 37ch, 38ch, and 39ch out of 0 to 39ch are used for the advertising operation and the scan operation. The scan setting values are generated externally by the system administrator based on the configuration of the entire communication system, and are distributed to the wireless communication device 1 in the communication system when the communication system is configured.

The connection communication control unit 14 performs a connection operation of communicating with another preset device in one-to-one communication via the wireless transmission and reception unit 16. The connection setting storage unit 15 stores information (e.g., device IDs of the opposite device that establishes the connection relationship) for specifying device in addition to the information that the connection communication 14 performs the communication by the connection operation, and connection setting values including at least the setting of whether the own device executes the slaves or the masters in the connection relationship. The connection communication control unit 14 performs connection communication with the partner specified by the connection setting value. The connection setting values are generated externally by the system administrator based on the configuration of the entire communication system, and are distributed to the wireless communication device 1 in the communication system when the communication system is configured.

The wireless transmission and reception unit 16 converts a message transmitted from the advertising communication control unit 11 or the connection communication control unit 14 into a wireless signal and transmits the wireless signal to another device. In addition, the wireless transmission and reception unit 16 generates a reception message from the received signal, and outputs the reception message to the advertising communication control unit 11 or the connection communication control unit 14 in accordance with the reception means of the reception message.

Here, the message processing unit 10 will be described in more detail. The message processing unit 10 transmits a message to the connection cluster by the connection operation when transmitting a message generated by the own device, and transmits the message to the other device via the advertising communication control unit when the own device a device for which the advertising operation is permitted in the connection cluster. When receiving a message from another device, the message processing unit 10 discards the received message in response to the fact that the received message is the same as the previously received message. Further, the message processing unit 10 performs processing according to the received message in response to the fact that the received message is new and the destination of the received message is the own device. The message processing unit 10 transmits the received message to device in the connection cluster by the connection operation in response to the fact that the received message is new and the destination of the received message is other device, and transmits the received message to the other device by the advertising operation when the own device is a device for which the advertising operation is permitted in the connection cluster.

The message processing unit 10 includes a data generation unit 20, a message generation unit 21, a message storage unit 23, a message relay determination unit 24, a message destination determination unit 25, a data extracting unit 26, and a data utilizing unit 27.

The data generation unit 20 generates data to be included in messages transmitted by the own device. The message generation unit 21 generates a message by adding headers such as a device ID of a sender, a device ID of a destination, a maximum number of relays of the message, a sequence number for identifying the message, and other information required for transmission to the data generated by the data generation unit 20. The message generated by the message generation unit 21 is output to the advertising communication control unit 11 and the connection communication control unit 14.

The message duplication determination unit 22 receives a received message from the advertising communication control unit or the connection communication control unit 14, and determines whether or not the received message is a previously received message. Here, when it is determined that the received message is the same as the previously received message, the message duplication determination unit 22 discards the received message. On the other hand, when it is determined that the received message is different from the previously received message, the message duplication determination unit 22 outputs the received message to the message relay determination unit 24 and the message destination determination unit 25. When the message duplication determination unit 22 determines that the received message is different from the previously received message, the message duplication determination unit 22 stores the received message in the message storage unit 23. The message duplication determination unit 22 determines whether or not the received message has been previously received with reference to the message stored in the message storage unit 23.

When it is determined by the message duplication determination unit 22 that the received message differs from the previously received message, the message relay determination unit 24 instructs the advertising communication control unit 11 and the connection communication control unit 14 to forward the received message to another device when another device is included in the destination of the received message.

When it is determined by the message duplication determination unit 22 that the received message differs from the previously received message, the message destination determination unit 25 transfers the received message to the data processing unit of the own device when the destination of the received message includes the own device. In the example shown in FIG. 1, the data processing unit includes a data extracting unit 26 and a data utilizing unit 27. In the wireless communication device 1, the data extracting unit 26 extracts data from messages, and the data utilizing unit 27 performs a processing using the extracted data. As an example of the data processing, there is processing for storing the setting values in the advertising setting storage unit 12, the scan setting storage unit 13, and the connection setting storage unit 15.

Figure 2:
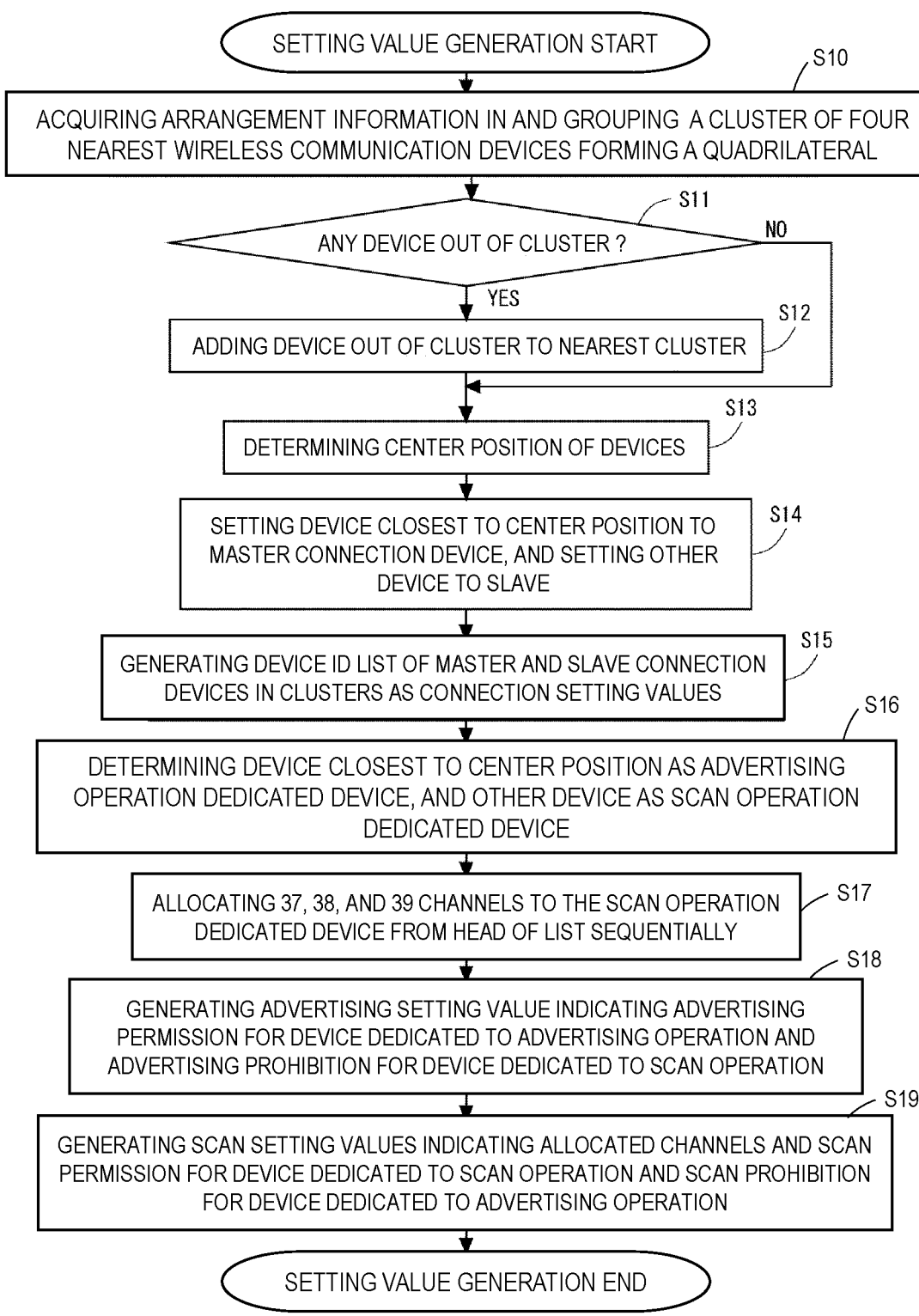
FIG. 2 is a flow chart illustrating the generation of settings to be applied to a wireless communication device according to the first embodiment.

Next, a method of generating the advertising setting value, the scan setting value, and the connection setting value will be described. This setting value generation processing is performed, for example, by executing a setting value generation program in an external computer. FIG. 2 is a flow chart for explaining the generation of setting values applied to the wireless communication device 1 according to the first embodiment.

As shown in FIG. 2, in the setting values generation processing, first, the arrangement information of the four wireless communication device 1 for which the communication system is to be constructed is acquired, a quadrilateral formed by the four wireless communication device 1 is formed, and a grouping processing for forming connection clusters is performed for each of the four wireless communication device 1 (step S10). Next, it is determined whether or not there is a wireless communication device 1 that does not belong to any of the connection clusters in the grouping processing in step S10 among the wireless communication device 1 constructing the communication systems (step S11). In step S11, if there is no wireless communication device 1 that does not belong to any of the connection clusters, the processing proceeds to step S13. On the other hand, when the wireless communication device 1 that does not belong to any of the connection clusters exists in step S11, the wireless communication device 1 that is out of the group is added to the connection cluster at the nearest position (step S12). Steps S11 and S12 are grouping correction processing.

In step S13, the region center setting processing for determining the center position of the arrangement area where all of the wireless communication device 1 constituting the communication system is disposed is performed (step S13). Thereafter, in the connection clusters, a master slave setting processing is performed in which the wireless communication device closest to the center position is set to the master connection device, and the wireless communication device other than the master connection device is set to the slave connection device (step S14). Next, a connection setting value generation processing is performed to generate lists of device IDs of the master connection device and the slave connection device included in the respective connection clusters as connection setting values. More specifically, the connection setting value generation processing performs a connection setting value generation processing for generating a connection setting value in which the communication destination of the slave connection device is set to the master connection device (step S15).

Next, device which is closest to the center position among devices included in the connection clusters is determined as the advertising operation dedicated device, and device other than the above is determined as the scan operation dedicated device (step S16). In addition, wireless channels (scan channels) permitted for the advertising operation and the scan operation are assigned to the dedicated scan operation device of the respective connection clusters in order from the head of the lists. In other words, in one connection cluster, there is a wireless communication device 1 to which a different scan channel is allocated, and the scan channel of the wireless communication device 1 is allocated so that all the channels of the scan channel can be covered by all the wireless communication device 1 in the connection cluster. The wireless channels permitted for these operations are 37, 38, and 39 channels in the BLE technology (step S17).

Next, an advertising setting value generating processing for generating an advertising setting value indicating advertising permission for device dedicated to the advertising operation and advertising prohibition for device dedicated to the scan operation is performed (step S18). A scan setting value generating processing is performed to generate scan setting values indicating allocated channels and scan permission for a device dedicated to the scan operation and scan prohibition for a device dedicated to the advertising operation (step S19).

Figure 3:
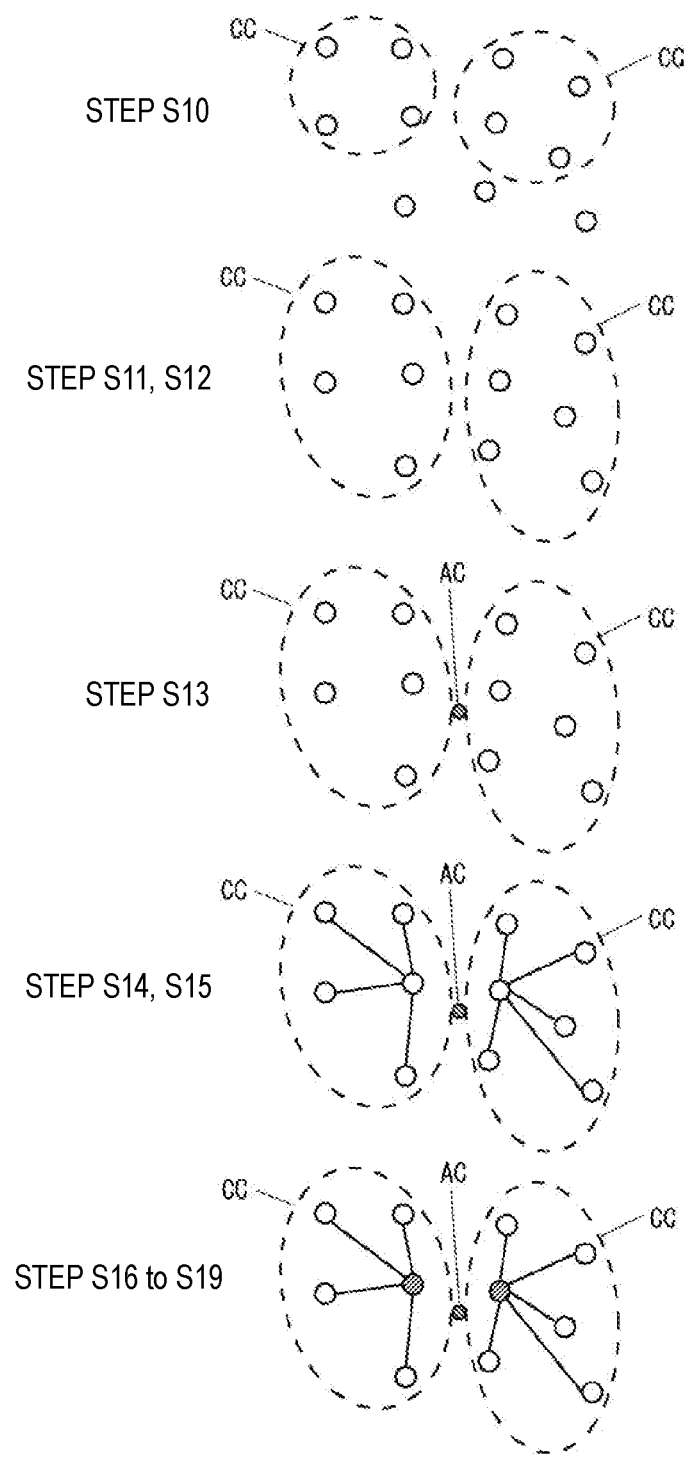
FIG. 3 is a schematic diagram of a communication system constructed in accordance with the setting value generation method shown in FIG. 2.

Here, a configuration of a communication system constructed on the basis of the respective setting values generated along the flow chart shown in FIG. 2 will be described. FIG. 3 is a schematic diagram of a communication system constructed in accordance with the setting value generating method shown in FIG. 2. FIG. 3 shows an exemplary configuration of a communication system using eleven wireless communication device 1.

As shown in FIG. 3, in the grouping processing of S10 of FIG. 2, four pieces of wireless communication device 1 serving as the vertices of the rectangle are grouped as one connection cluster CC. In the embodiment shown in FIG. 3, two connection clusters CC are formed and three wireless communication device 1 are disconnected from the connection clusters CC.

Subsequently, in the grouping correcting processing of steps S11 and S12 of FIG. 2, the wireless communication device 1 which is not incorporated into the connection cluster CC in step S10 is incorporated into the connection cluster CC which is closest to the wireless communication device 1 which is not incorporated. As a result, five pieces of wireless communication device 1 are incorporated in one connection cluster CC, and six pieces of wireless communication device 1 are incorporated in the other connection cluster CC.

Subsequently, in the area center setting processing of S13 in FIG. 2, the center position AC in the areas where all the wireless communication device 1 constructing the communication system are arranged are set. In the example shown in FIG. 3, the center position AC is set in a region sandwiched between two connection clusters CC.

Subsequently, in the master slave setting processing of step S14 and the connection setting value generation processing of step S15, the wireless communication device 1 closest to the center position AC is set to the master connection device, the other wireless communication device 1 is set to the slave connection device, and the connection setting value for setting the master connection device as the opposite device of the connection communication of the slave connection device is generated. In FIG. 3, the path of the connection communication is indicated by a solid line.

Next, the advertising setting value generation processing and the scan setting value generation processing performed in steps S16 to S19 will be described. In the advertising setting value generation processing, the master connection device is given permission for the advertising operation, and the slave connection device generates the advertising setting value indicating the advertising prohibition. In the scan setting value generation processing, a scan setting value indicating, for each device, channels used in the scan operations and scan permission is generated in the slave connection device (for example, a device dedicated to the scan operation). In the scan setting value, a value indicating scan prohibition is described in the master connection device (e.g., a device dedicated to the advertising operation).

Figure 4:
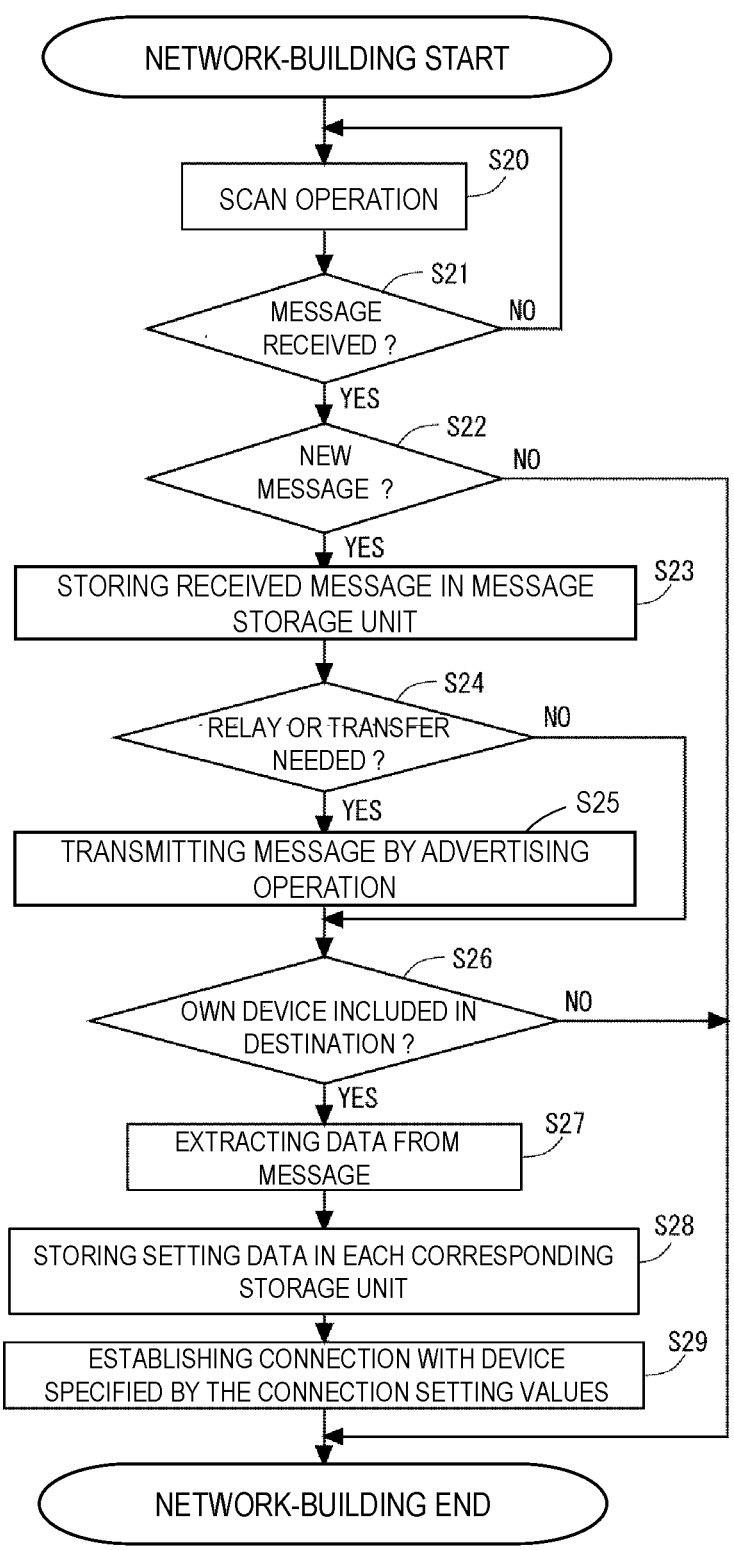
FIG. 4 is a flow chart for explaining a network-building processing in the communication system according to the first embodiment.

In the communication system according to the first embodiment, the communication path in the communication system is constructed by distributing the setting value generated based on the setting value generation methods described with reference to FIGS. 2 and 3 to the wireless communication device 1 which constructs the communication system. FIG. 4 is a flow chart for explaining a network-building processing in the communication system according to the first embodiment.

In the communication system according to the first embodiment, the wireless communication device 1 serving as a network node in the system receives messages transmitted by an advertising operation from another device by a scan operation. Therefore, the communication system according to the first embodiment distributes the setting value generated in the setting value generation processing to all the wireless communication device 1 from any wireless communication device 1 in the communication system. The operation shown in FIG. 4 is an operation of the wireless communication device 1 that receives messages distributed from the wireless communication device 1, which is the starting point of the distribution processing.

As shown in FIG. 4, the wireless communication device 1 of first embodiment, first in the network-building processing, repeats the scan operation until it receives messages (step S20, S21). In this scan operation, for example, the scan operation is repeated while sequentially switching the scan channels of 37ch to 39ch in a time division manner.

When a message is received by the scan operation in step S20, the message duplication determination unit 22 determines whether the received message is a new message (step S22). If the received message is a previously received message in step S22, the message duplication determination unit 22 discards the received message and ends the network construction processing. On the other hand, if the message received in step S22 is a new message, the message duplication determination unit 22 stores the received message in the message storage unit 23 (step S23).

Subsequent to step S23, the message relay determination unit checks the destination of the received new message, and determines whether or not the new message needs to be relayed or transferred to another device (step S24). If it is determined in step S24 that the message does not need to be relayed or transferred, the message destination determination unit 25 determines whether the message is addressed to the own device (step S26). On the other hand, when it is determined in step S24 that the message needs to be relayed or transferred, the message relay determination unit 24 transmits the received message to another device by using the advertising operation of the advertising communication control unit 11 (step S25). Then, the wireless communication device 1 performs a destination determination processing in S26.

In S26, if the destination of the received message does not include its own device, the wireless communication device 1 discards the received message and ends the network-building processing. On the other hand, if it is determined in step S26 that the own device is included in the destination of the received message, the wireless communication device 1 extracts data from the message by the data extracting unit 26 (step S27). Then, the data extracted by the data utilizing unit 27 is used. In the network construction processing, the data is the advertising setting value, the scan setting value, and the connection setting value, and the data utilizing unit 27 stores the data in a storage unit (for example, the advertising setting storage unit 12, the scan setting storage unit 13, and the connection setting storage unit 15) corresponding to the received setting value in accordance with the type of the setting value included in the received data (step S28).

In operation S29, wireless communication device 1 according to the first embodiment establishes a connection communication path with device specified as the connection destination of the connection communication indicated by the connection setting values stored in the connection setting storage unit 15 (step S29). Then, the wireless communication device 1 according to the first embodiment terminates the network-establishing processing in response to the connection communication path established in S29. In step S28, in response to the advertising setting value stored in the advertising setting storage unit 12, the wireless communication device 1 is switched to allow or prohibit the advertising operation. In step S28, in response to the scan setting value stored in the scan setting storage unit 13, the scan channels used in the scan operation of the wireless communication device 1 are fixed.

Figure 5:
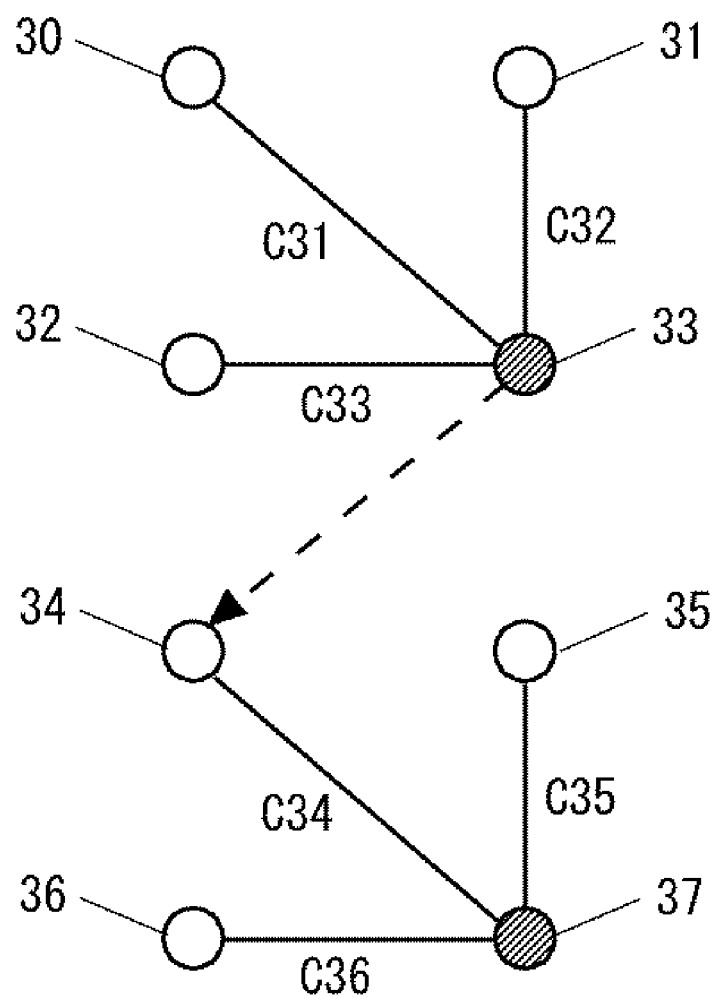
FIG. 5 is a schematic diagram of a system illustrating an exemplary communication path in a communication system according to the first embodiment.
Figure 5:

An example of a communication path of a communication system constructed through the network construction processing described in FIG. 4 will be described. FIG. 5 is a schematic diagram of a system for explaining an exemplary communication path in the communication system according to the first embodiment. In the explanation of FIG. 5, the wireless communication device 1 in the communication systems is referred to as nodes.

In the communication system according to the first embodiment shown in FIG. 5, a first connection cluster is formed by the nodes 30 to 33, and a second connection cluster is formed by the nodes 34 to 37. In each node cluster, the nodes 33 and 37 for which the advertising operation is permitted are set as master connection devices, and other nodes in the cluster are set as slave connection devices, and a connection communication path is established between the master connection device and each slave connection device. In FIG. 5, a communication path is constructed from the node 33 belonging to the first connection cluster to the node 34 of the second connection cluster. With such a network configuration, in the connection cluster, it is possible to transmit and receive a message by the connection operation without using a channel used in the advertising operation and the scan operation. For different connection clusters, messages can be transmitted and received using an advertising operation.

Figure 6:
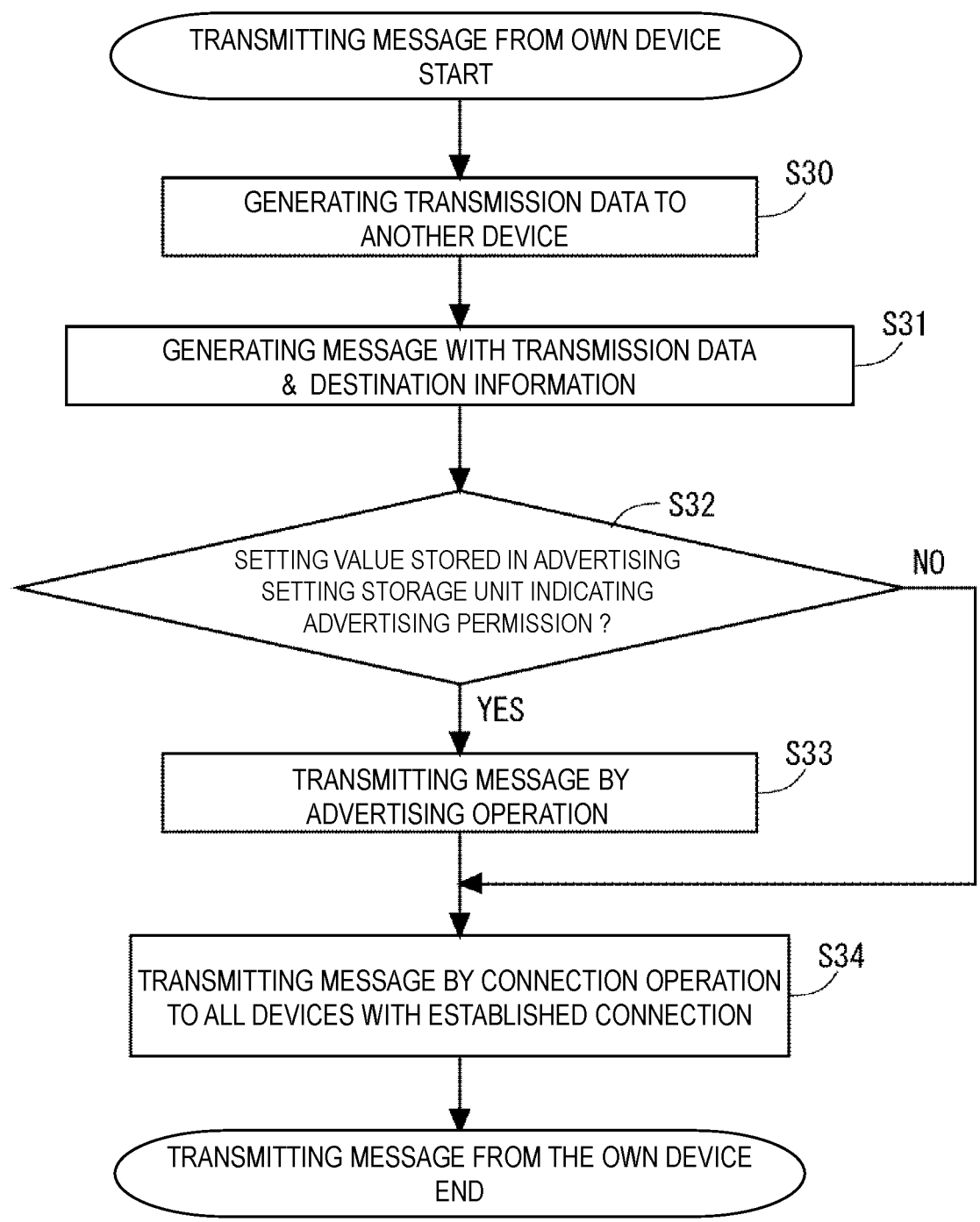
FIG. 6 is a flow chart for explaining a processing of transmitting messages from the own device in the wireless communication device according to the first embodiment.

Next, the operation of the wireless communication device 1 according to the first embodiment used in the communication system having the network path constructed as described above will be described. First, a processing of transmitting messages from the own device will be described. FIG. 6 is a flow chart for explaining a processing of transmitting messages from the own device in the wireless communication device according to the first embodiment.

As shown in FIG. 6, in the wireless communication device 1 according to the first embodiment, when a message generated by the own device is transmitted, first, the data generation unit generates transmission data to be transmitted to another device (step S30). The message generation unit 21 generates a message storing the generated transmission data, additional information such as device ID of the sender, device ID of the destination, the headers of the maximum number of relays of the message, the sequence number for identifying the message, and other information required for transmission (step S31).

Then, the message generation unit 21 outputs the generated message to the advertising communication control unit 11 and the connection communication control unit 14. Here, when the advertising setting value stored in the advertising setting storage unit 12 indicates advertising permission, the wireless communication device 1 transmits a message to another device by an advertising operation using the advertising communication control unit 11 (steps S32 and S33). After transmitting the message by the advertising operation, the wireless communication device 1 transmits the message by the connection operation to the wireless communication device 1 whose connection has been established based on the connection setting (step S34). On the other hand, when the advertising setting value stored in the advertising setting storage unit 12 indicates that advertising is prohibited, the wireless communication device 1 transmits a message by a connection operation to the wireless communication device 1 whose connection has been established based on the connection setting value without performing the advertising operation (step S34).

Figure 7:
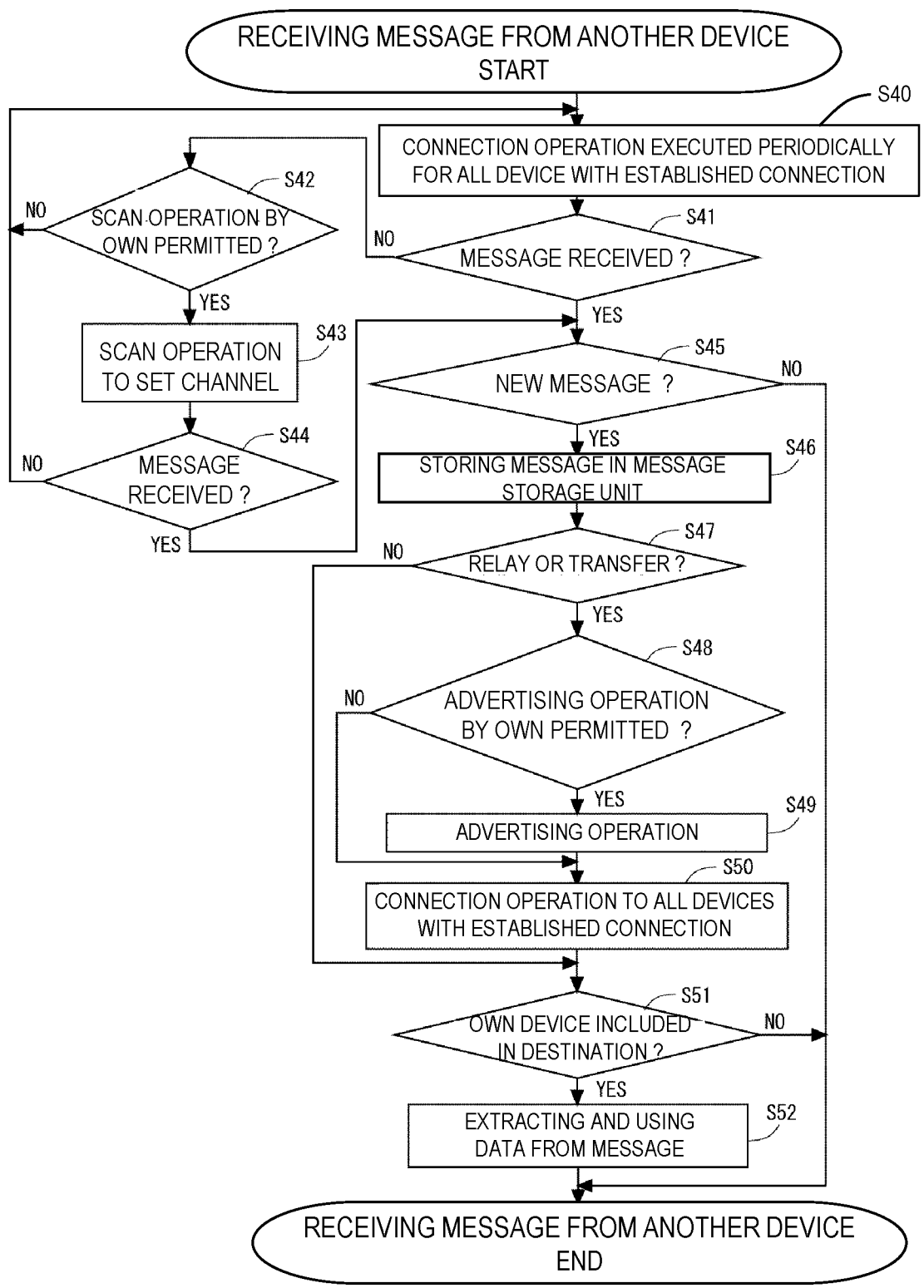
FIG. 7 is a flow chart for explaining a processing of receiving messages from another device in the wireless communication device according to the first embodiment.

Next, a processing of receiving messages from another device will be described. FIG. 7 is a flow chart for explaining a processing of receiving messages from another device in the wireless communication device 1 according to the first embodiment.

As shown in FIG. 7, in the wireless communication device 1 according to the first embodiment, when a message is received from another device, the connection communication control unit is periodically operated, and the connection operation is executed for all device that have established the connection communication path (step S40). If the message is not received by the connection operation in step S40, the scan setting value stored in the scan setting storage unit 13 is referred to, and if the own device is permitted to perform the scan operation, the scan operation is executed on the scan channel described in the scan setting value to confirm whether or not the message is received (steps S42 to S44). The processing of steps S40 to S44 is repeatedly executed until a message is received.

When the message duplication determination unit 22 receives the message in steps S40 to S44, the wireless communication device 1 determines whether or not the received message is a new message in step S45 (step S45). If the message received in step S45 is a previously received message, the message duplication determination unit 22 discards the received message and ends the network construction processing. On the other hand, if the message received in step S45 is a new message, the message duplication determination unit 22 stores the received message in the message storage unit 23 (step S46).

Following step S46, the message relay determination unit 24 confirms the destination of the received new message, and determines whether or not the message needs to be relayed or transferred to another device (step S47). When it is determined in step S47 that the message is not to be relayed or transferred, the message destination determination unit 25 determines whether the message is addressed to the own device (step S51). On the other hand, when it is determined in step S47 that the message needs to be relayed or transferred, if the own device itself is a device for which the advertising operation is permitted, the message relay determination unit 24 transmits the received message to another device by using the advertising operation of the advertising communication control unit 11 (steps S48 and S49). Further, after sending a message by the advertising operation, the wireless communication device 1 transmits a message by the connection operation to the wireless communication device 1 to which the connection is established based on the connection setting (step S50).

When the step S50 is completed, or when it is determined in the step S47 that the relay or the transmission is not necessary, the wireless communication device 1 performs the destination determination processing of the step S51. In S52, if the destination of the received message does not include its own device, the wireless communication device 1 discards the received message and terminates the network-building processing. On the other hand, if it is determined in step S51 that the own device is included in the destination of the received message, the wireless communication device 1 extracts data from the message by the data extracting unit 26 and uses the extracted data in step S52 (step S52).

Figure 8:
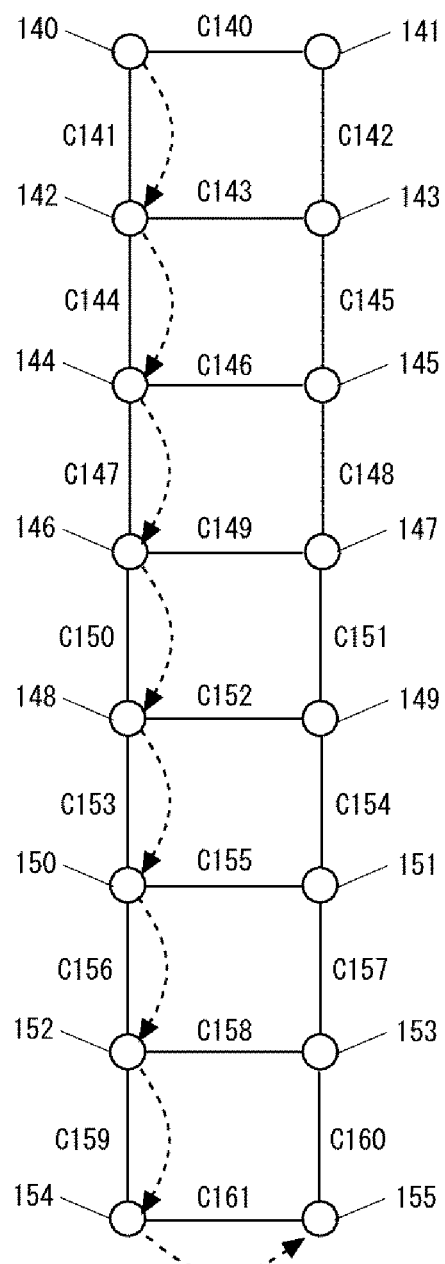
FIG. 8 is a schematic diagram of a communication path difference between a wireless communication device according to the first embodiment and a wireless communication device according to a comparative embodiment.
Figure 8:
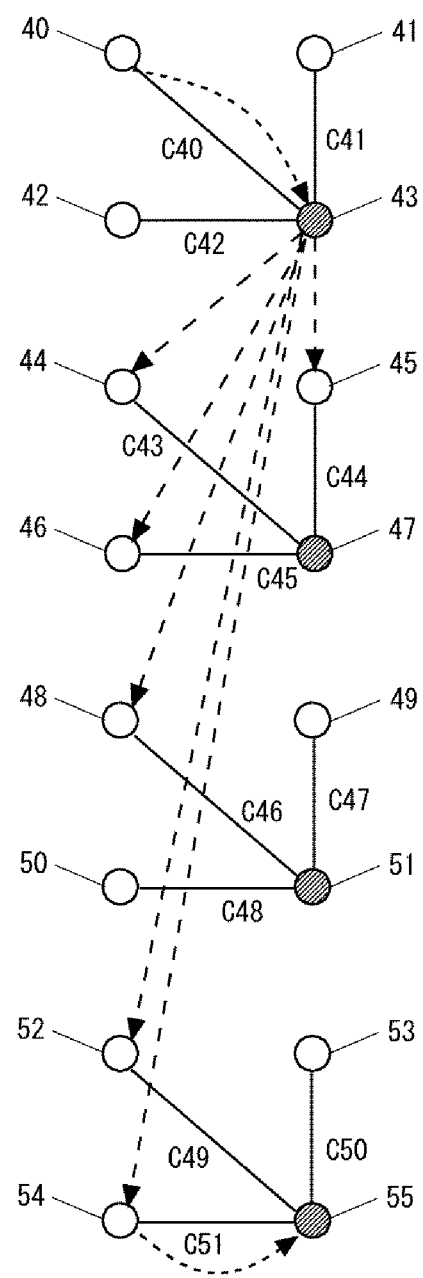

Next, a data propagation path in a communication system constructed using the wireless communication device 1 according to the first embodiment will be described. Accordingly, as an example, FIG. 8 shows a schematic diagram of a system that explains the difference in the communication path between the wireless communication device according to the comparative example and the wireless communication device 1 according to the first embodiment. The wireless communication device according to the comparative example shown in FIG. 8 constructs communication systems in which networks are configured by performing only connection communication, for example. In the example shown in FIG. 8, the wireless system according to the comparative example is constructed by the nodes 140 to 155 each serving as the wireless communication device, and the communication system according to the first embodiment is constructed by the nodes 40 to 55 each serving as the wireless communication device 1 according to the first embodiment. In FIG. 8, the communication path constructed by the connection operation is indicated by a solid line, and a symbol with C as an initial letter is attached.

As shown in FIG. 8, in the communication system according to the comparative example, when data is transmitted from the node 140 to the node 155, the data is transferred through eight paths of the connection communication path C141, C144, C147, C150, C153, C156, C159, C161. On the other hand, in the communication system according to the first embodiment, when data is transmitted from the node 40 to the node 55, corresponding from the node 140 to the node 155, the communication system passes through three paths, i.e., the connection communication paths C40 and C51, and the advertising communication path transmitted from the node 43 to the node 54. In the communication system according to the first embodiment, messages can be transmitted to a more distant device through a shorter path than in the communication system according to the comparative embodiment.

As described above, in the communication systems using the wireless communication device 1 according to the first embodiment, messages are communicated between device belonging to the same connection clusters by a connection operation using channels differing from the advertising operation. In the communication system according to the first embodiment, the wireless communication system device 1 for which only one advertising operation is permitted is set in the respective connection clusters. Then, the wireless communication device 1 for which the advertising operation is permitted transmits messages to the wireless communication device 1 belonging to a connection cluster that differs from the connection cluster to which its own device belongs.

As a result, in the communication system according to the first embodiment, it is possible to secure a communication path between device in a wider range while suppressing the amount of communication due to the advertising operation. Further, the communication system according to the first embodiment enables high-speed data communication by shortening the length of a communication path as compared with a communication system in which messages are propagated only by a connection operation. Further, by suppressing the amount of communication due to the advertising operation, it is possible to suppress the congestion of the wireless signal, increase the arrival rate of the message, and improve the communication speed.

In communication systems according to the first embodiment, messages are propagated by connection operations in connection clusters. In this connection operation, when the opposite device fails to receive the message, the message can be retransmitted, so that the arrival rate of the message can be increased. Since the master connection device in the connection cluster assigns times at which the respective connection operations do not collide to the slave connections device, even if four or more device are incorporated in the connection cluster, the wireless signals of the connection operations in the connection cluster do not collide.

In the communication system according to the first embodiment, the communication system is limited to one device that performs advertising operations in connection clusters, and the other device performs only scan operations. In the scan operation, each device receives only one assigned channel. As a result, in the communication systems according to the first embodiment, there is no instantaneous stop of wireless reception for switching reception channels, and it is possible to prevent missed messages. Even when one scan channel is congested by the operation of another wireless device, in the communication system according to the first embodiment, the other device belonging to the same connection cluster performs the scan operation on another scan channel in which congestion does not occur, thereby preventing the message from being missed. In other words, in the communication systems according to the first embodiment, it is possible to improve the arrival rate of messages by performing operations in which device complements each other in connection clusters.

In the communication system according to the first embodiment, device for which the advertising operation is permitted is limited to one of a plurality of wireless communication systems device 1 belonging to the same connection cluster. Therefore, when a plurality of wireless communication device 1 belonging to the same connection transmit messages, device which is permitted to perform the advertising operation sequentially transmits a plurality of messages. As a result, in the communication system according to the first embodiment, the wireless communication device 1 belonging to the same connection cluster does not collide with the transmission timing of the message, and the data arrival rate can be increased.

In second embodiment, a wireless communication device 2, which is another form of the wireless communication device 1 according to the first embodiment, will be described. In the description of the second embodiment, the same components as those described in the first embodiment are denoted by the same reference numerals as those of the first embodiment, and description thereof is omitted.

Figure 9:
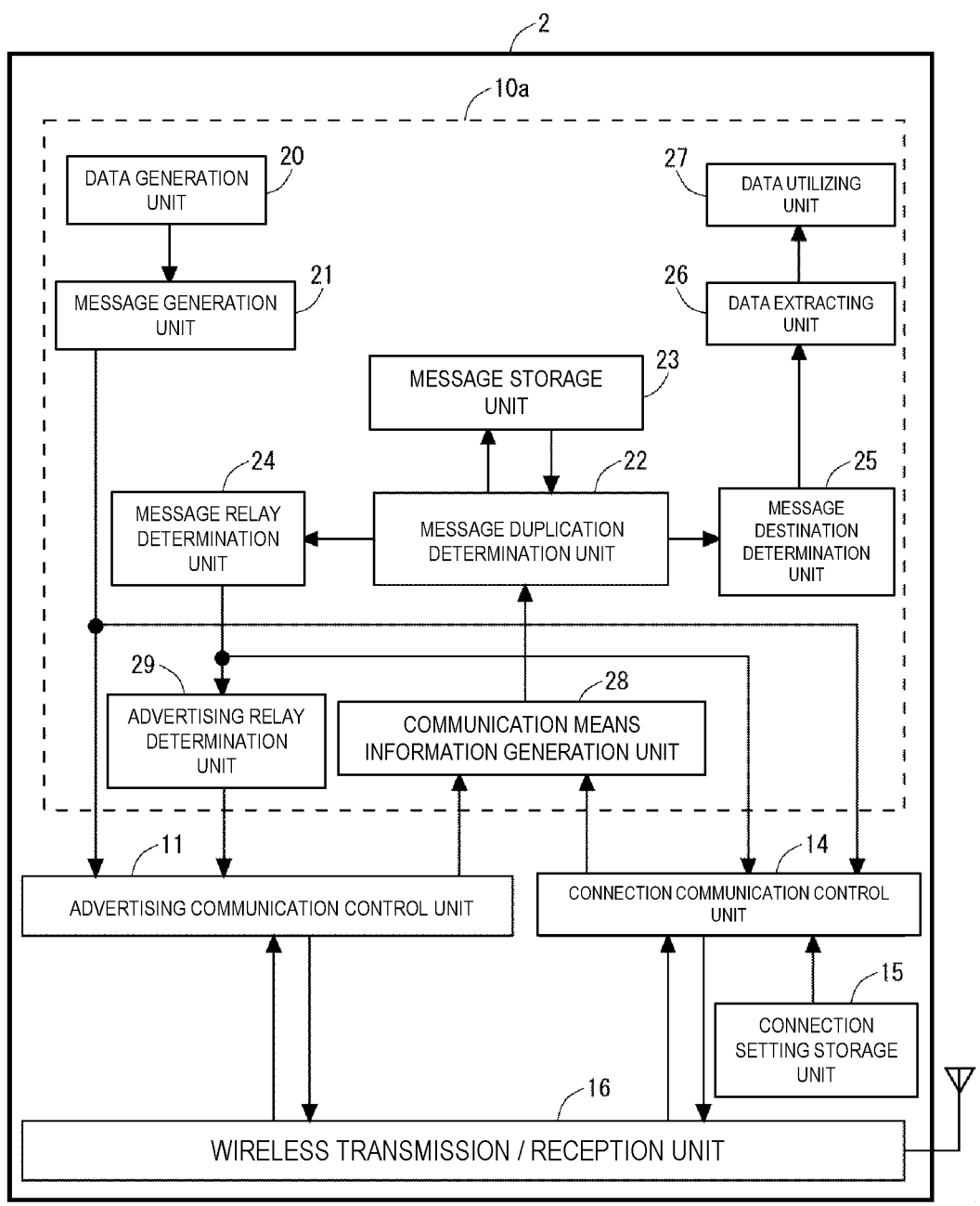
FIG. 9 is a diagram of a wireless communication device according to the second embodiment.

FIG. 9 shows a diagram of a wireless communication device according to the second embodiment. As shown in FIG. 9, in the wireless communication device 2 according to the second embodiment, the advertising setting storage unit 12 and the scan setting storage unit 13 are deleted from the wireless communication device 1, and the message processing unit 10 is replaced with a message processing unit 10a. The message processing unit 10a is obtained by adding a communication means information generation unit 28 and an advertising relay determination unit 29 to the message processing unit 10.

In the wireless communication device 2, the message processing unit 10a selects whether or not to use the advertising communication control unit 11 in accordance with the message reception path without setting permission or prohibition of the advertising operation for each device. In the wireless communication device 2, when the advertising communication control unit 11 performs the scan operation, the scan operation is performed on all the channels allocated as the scan channels.

The communication means information generation unit 28 adds reception means information indicating whether the reception path of the message is through the advertising communication control unit 11 or the connection communication control unit 14 to the message. The advertising relay determination unit 29 refers to the reception means information when transferring the message to another device, and instructs the advertising communication control unit 11 to transmit the message when the reception means information indicates the advertising communication control unit 11. When the reception means information indicates the connection communication control unit 14, the advertising relay determination unit 29 discards the transmission of the message to be transferred.

Figure 10:
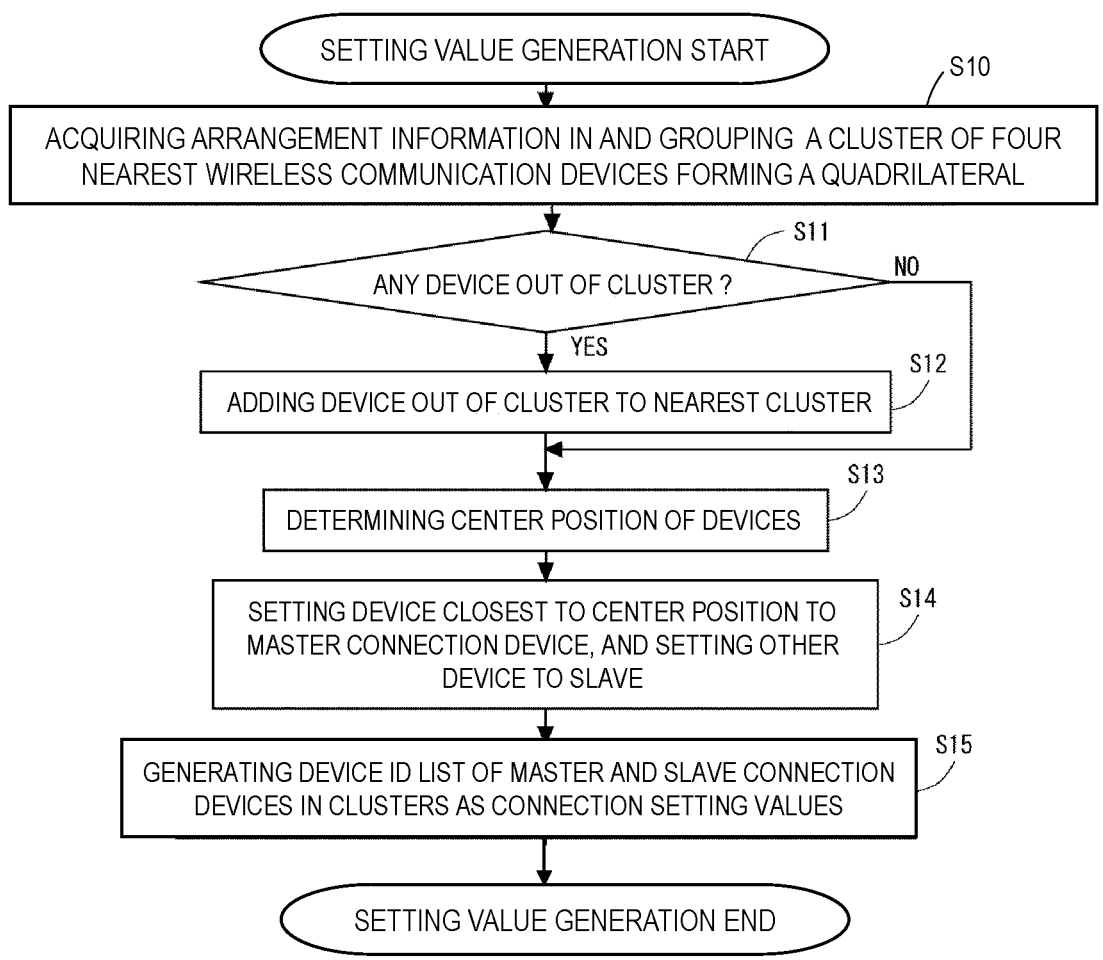
FIG. 10 is a flow chart for explaining the generation of setting values to be applied to the wireless communication device according to the second embodiment.

Next, how to generate setting values applied to the wireless communication device 2 according to the second embodiment will be described. FIG. 10 is a flow chart for explaining the generation of setting values applied to the wireless communication device 2 according to the second embodiment.

In the wireless communication device 2 according to the second embodiment, the advertising setting value and the scan setting value are not applied. Therefore, as shown in FIG. 10, the method of generating the setting value applied to the wireless communication device 2 according to the second embodiment is completed by the processing up to step S15 of the setting value generating method described with reference to FIG. 2.

Figure 11:
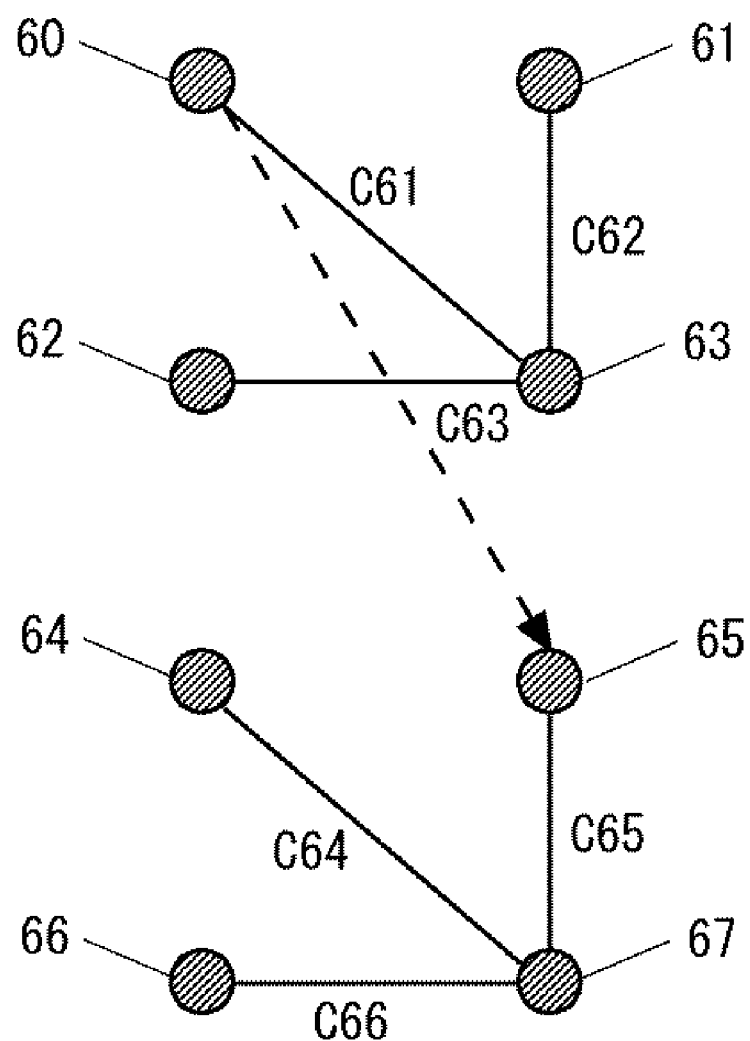
FIG. 11 is a schematic diagram of a system for explaining an exemplary communication path in a communication system according to the second embodiment.
Figure 11:

Here, examples of communication paths of communication systems configured using the wireless communication device 2 according to the second embodiment will be described. FIG. 11 is a schematic diagram of a system for explaining an exemplary communication path in a communication system according to the second embodiment. As shown in FIG. 11, in the communication system according to the second embodiment, the advertising operation is permitted to all the wireless communication device 2. On the other hand, as shown in FIG. 11, the plurality of wireless communication device 2 are classified into a plurality of connection clusters. In the example shown in FIG. 11, a first connection cluster is formed by nodes 60 to 63, and a second connection cluster is formed by nodes 64 to 67. In the example shown in FIG. 11, the node 60 performs the advertising operation, and the node 65 receives the message issued by the node 60 by the scan operation.

Figure 12:
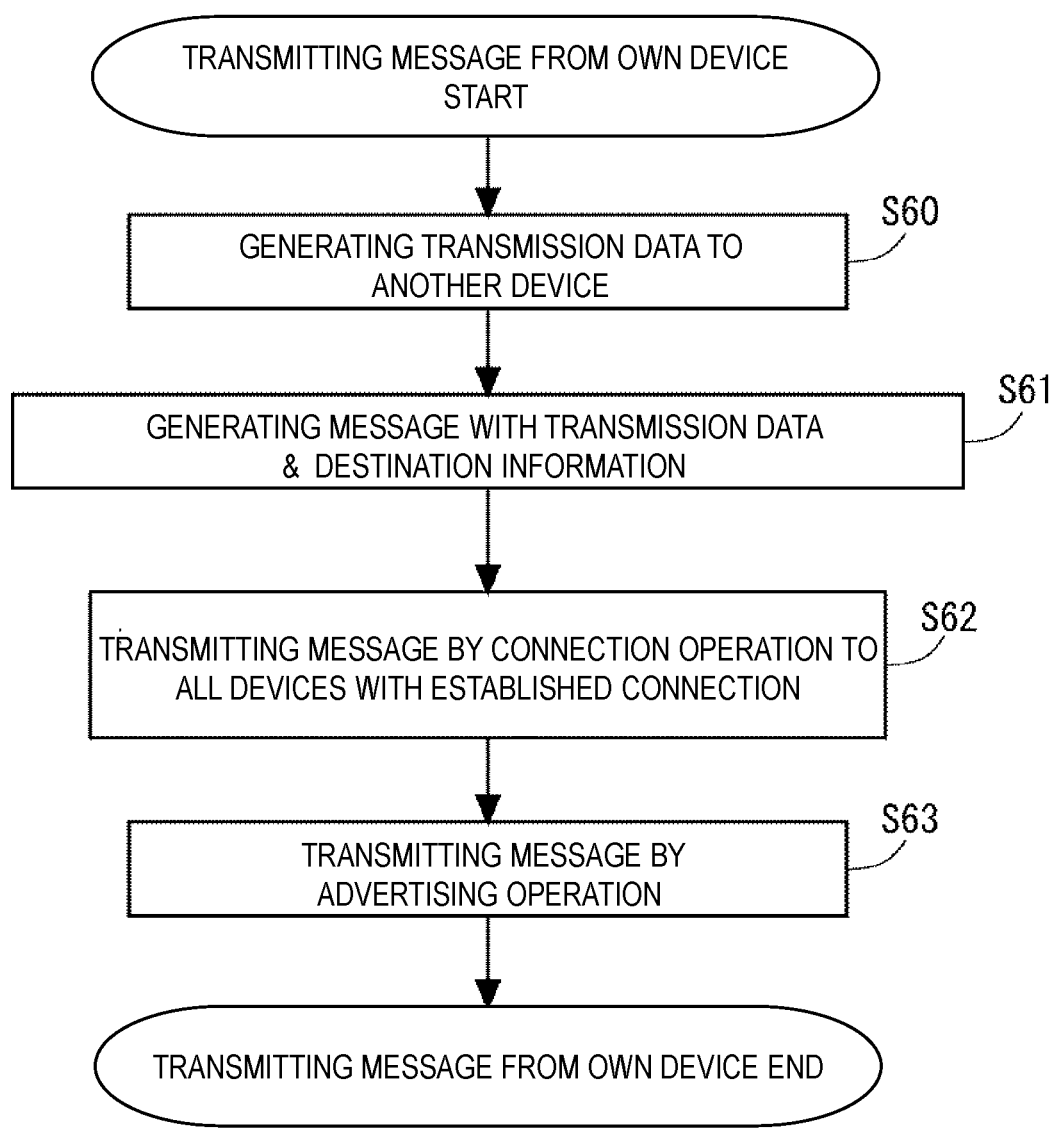
FIG. 12 is a flow chart for explaining the operation of the difference in transmitting messages from the own device in the wireless communication device according to the second embodiment.

The operation of the wireless communication device 2 according to the second embodiment when configuring such communication systems will be described below. First, a processing of transmitting messages from the own device will be described. FIG. 12 is a flow chart for explaining a processing of transmitting messages from the own device in the wireless communication device 2 according to the second embodiment.

As shown in FIG. 12, in the wireless communication device 2 according to the second embodiment, when a message generated by the own device is transmitted, first, the data generation unit 20 generates transmission data to be transmitted to another device (step S60). Next, the message generation unit 21 generates a message storing the generated transmission data, additional information such as device ID of the sender, device ID of the destination, the headers of the maximum number of relays of the message, the sequence number for identifying the message, and other information required for transmission (step S61).

Then, the message generation unit 21 first outputs the generated message to the connection communication control unit 14. The connection communication control unit 14 transmits messages to the wireless communication device 2 to which the connection has been established based on the connection setting values (step S62). Thereafter, the message generation unit 21 outputs the generated message to the advertising communication control unit 11. The advertising communication control unit 11 transmits messages to the other device by the advertising operation (step S63).

Figure 13:
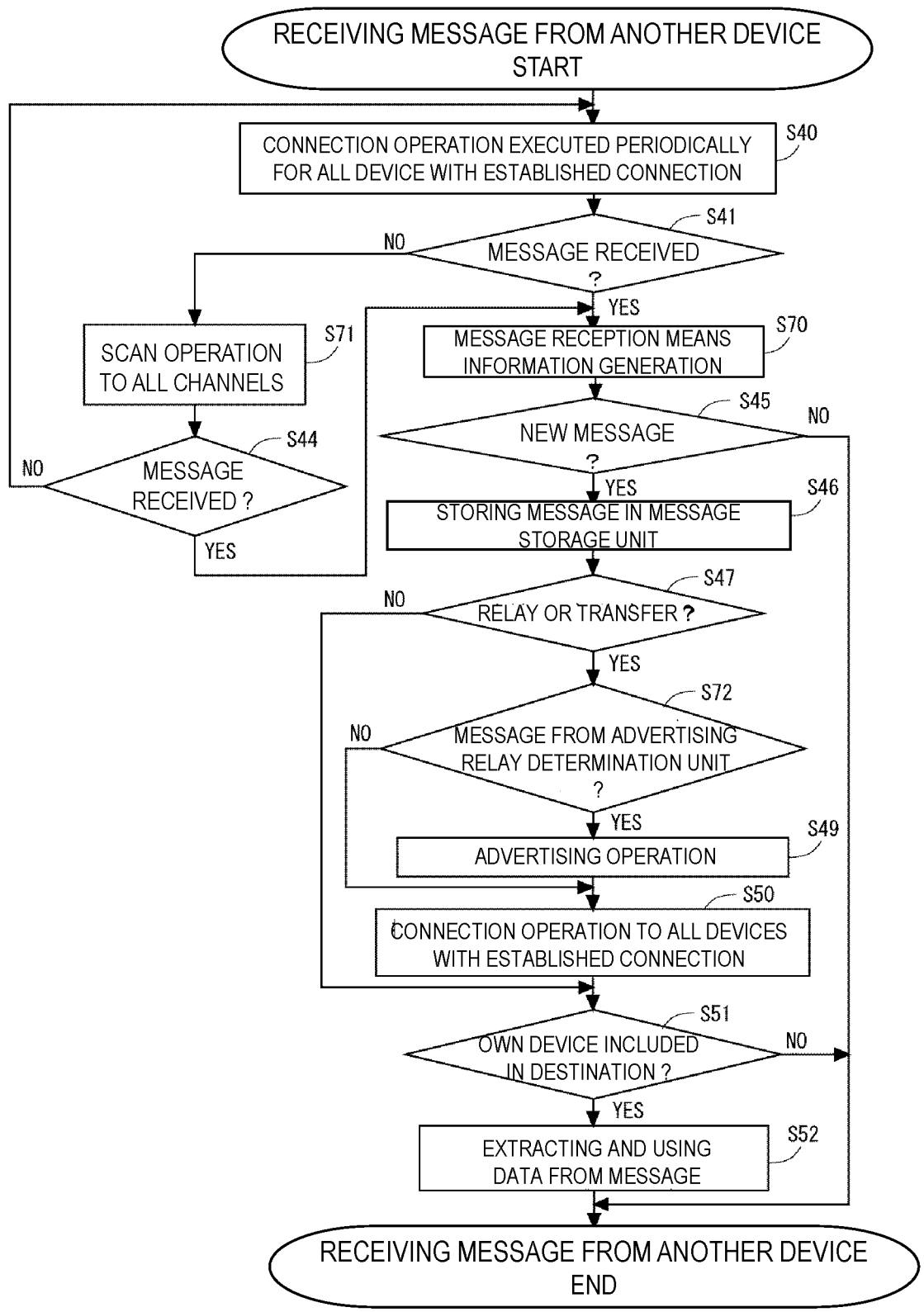
FIG. 13 is a flow chart for explaining a processing for messages received from another device in the wireless communication device according to the second embodiment.

Next, a processing of receiving messages from another device will be described. FIG. 13 is a flow chart for explaining a processing of receiving messages from another device in the wireless communication device 2 according to the second embodiment.

As shown in FIG. 13, the message reception processing of the wireless communication device 2 according to the second embodiment is that the processing of step S70 is added in the message reception processing of the wireless communication device 1 according to the first embodiment described with reference to FIG. 7, the processing of step S42 is deleted, and steps S43 and S48 are replaced with steps S71 and S72. That is, in the wireless communication device 2 according to the second embodiment, when the reception of the messages is not confirmed in step S41, the advertising communication control unit 11 performs the scan operation using all the scan channels without confirming the permission or prohibition of the scan operation in step S71.

In the wireless communication device 2 according to the second embodiment, when the reception of the message is confirmed in step S41 or step S44, the communication means information generation unit 28 generates reception means information of the message (step S70). After the processing of step S70, the wireless communication device 2 performs a processing on the messages received after step S45.

When it is determined in S47 that the message needs to be relayed or transferred, the wireless communication device 2 of the second embodiment refers to the reception unit information added to the message received by the advertising relay determination unit 29. Then, when the reception unit information indicates the advertising communication control unit 11, the advertising relay determination unit 29 transmits the message to the other device by using the advertising operation of the advertising communication control unit 11 (steps S72 and S49). On the other hand, when the reception means information indicates the connection communication control unit 14, the advertising relay determination unit 29 discards the received message passed from the message relay determination unit 24 ('NO' branch of step S72). Thereafter, the message relay determination unit 24 transmits the received message to the other device using the connection operation of the connection communication control unit 14 (step S50).

Figure 14:
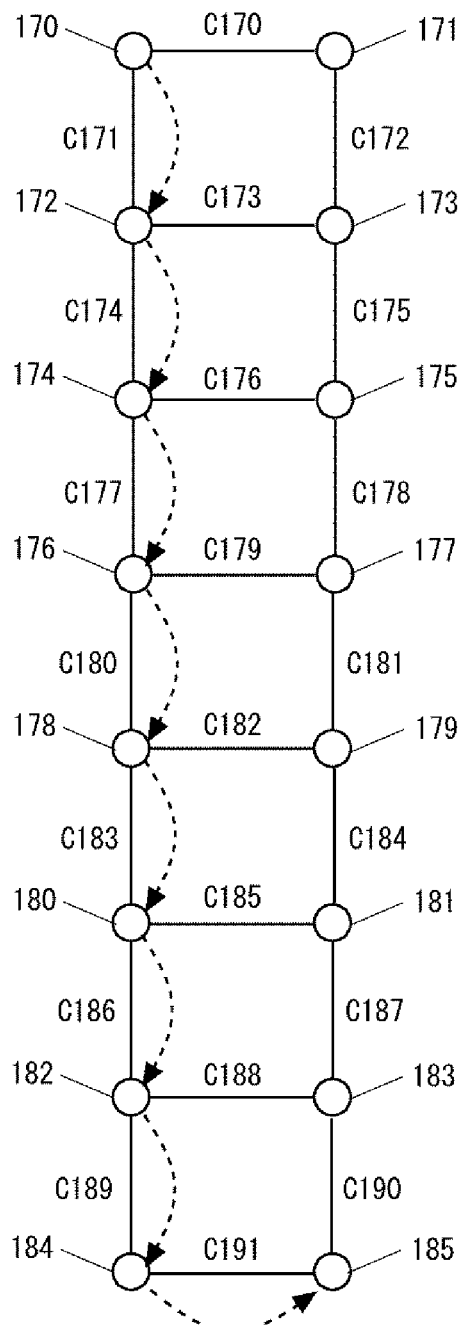
FIG. 14 is a schematic diagram of a communication path difference between a wireless communication device according to the second embodiment and a wireless communication device according to a comparative embodiment.
Figure 14:
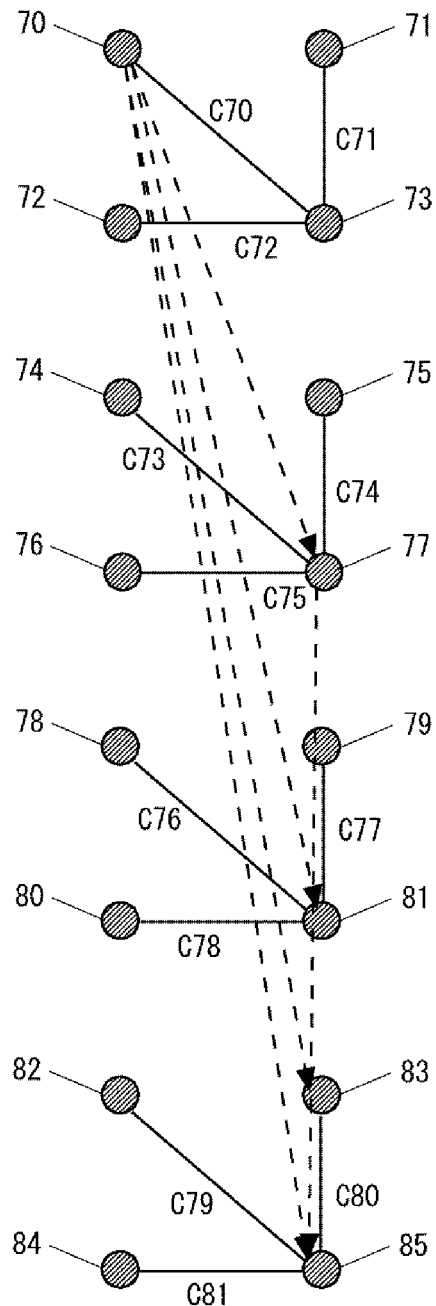
Figure 14:

Next, a data propagation path in a communication system constructed using the wireless communication device 2 according to the second embodiment will be described. Accordingly, as an example, FIG. 14 shows a schematic diagram of a system that explains the difference in the communication path between the wireless communication device according to the comparative example and the wireless communication device 2 according to the second embodiment. The wireless communication device according to the comparative example shown in FIG. 14 constructs communication systems in which networks are configured by performing only connection communication, for example. In the example shown in FIG. 14, the wireless system according to the comparative example is constructed by the nodes 170 to 185 each serving as the wireless communication device, and the communication system according to the second embodiment is constructed by the nodes 70 to 85 each serving as the wireless communication device 2 according to the second embodiment. In FIG. 14, the communication path constructed by the connection operation is indicated by a solid line, and a symbol with C as an initial letter is attached.

As shown in FIG. 14, in the communication system according to the comparative example, when data is transmitted from the node 170 to the node 185, the data is transferred through eight paths of the connection communication path C171, C174, C177, C170, C173, C176, C179, C171. On the other hand, in the communication system according to the second embodiment, when data is transmitted from the node 70 to the node 85, corresponding from the node 170 to the node 185, only the wireless system path formed by the advertising operation of the node 70 need to be used. In the communication system according to the second embodiment, messages can be transmitted to a more distant device through a shorter path than in the communication system according to the comparative embodiment.

As described above, in the wireless communication device 2 according to the second embodiment, when the message is received by the connection operation, the advertising operation is suppressed by the communication means information generation unit 28 and the advertising relay determination unit 29. As a result, in the communication system using the wireless communication device 2 according to the second embodiment, device of performing the advertising operation in the connection clusters is limited to one as in the communication system according to the first embodiment. As a result, in the communication system according to the second embodiment, similarly to the communication system according to the first embodiment, it is possible to suppress the congestion of wireless signals, thereby realizing an improvement in the data arrival rate and an improvement in the data transmission rate.

In the communication systems according to the second embodiment, the advertising operation can be performed in any device in the connection clusters. As a result, even if device in the connection cluster becomes unable to perform the advertising operation for some reason, messages can be transmitted to other connection clusters without being affected by other device. In other words, the reliability of networks can be improved by constructing communication systems using the wireless communication device 2 according to the second embodiment.

Further, in the wireless communication device 2 according to the second embodiment, the advertising setting value and the scan setting value used in the wireless communication device 1 according to the first embodiment are not necessary. Thus, in the construction of the communication system according to the second embodiment, it is possible to reduce the processing required for the processing of generating the setting values.

Although the invention made by the inventor has been specifically described based on the embodiment, the present invention is not limited to the embodiment already described, and it is needless to say that various modifications can be made without departing from the gist thereof.

(Additional Statement 1)

A setting value generation program for a communication system comprising a plurality of wireless communication devices that are installed in areas in which the plurality of wireless communication devices can communicate with each other using a wireless signal from its own device, each of the plurality of wireless communication devices comprising:

a transmission and reception unit that performs communication using a wireless signal;

an advertising communication control unit that performs an advertising operation that broadcasts a message to a plurality of unspecified other device via the transmission and reception unit, and a scan operation that receives the message broadcast by any of the plurality of unspecified other device;

a connection communication control unit that performs a connection operation that communicates with a preset specific other device in a one-to-one communication via the transmission and reception unit; and a message processing unit that processes the message to be transmitted and received via the transmission and reception unit, wherein the setting value generation program generates a setting value of an operation of the advertising communication control unit and the connection communication control unit, wherein the setting value generation program causes a computer to execute processings comprising:

position grasping to acquire device physical arrangement information of the plurality of wireless communication devices;

grouping to group adjacent wireless communication devices into at least one connection cluster by preset number;

grouping correction to incorporate the wireless communication device not belonging to any connection cluster in the grouping into adjacent connection clusters;

region center setting to determine a center position of an arrangement region including all the plurality of wireless communication devices;

master slave setting to set the wireless communication device closest to the center position to a master connection device in each of the connection cluster and set the wireless communication device other than the master connection device to a slave connection device; and connection setting value generation to generate a connection setting value for setting communication destination of the slave connection device to the master connection device.

(Additional statement 2) The setting value generation program according to additional statement 1, wherein the setting value generation program performs an advertising setting value generation processing that generates, for each of wireless communications, an advertising setting value for the master connection device to be set that the message is to be transmitted to an outside using the advertising operation, and for the slave connection device to be set that the advertising operation is to be stopped.

(Additional statement 3) The setting value generation program according to additional statement 1, wherein the setting value generation program performs a scan setting value generation processing that generates a scan setting value for each of the wireless communication devices to specify a channel used for the scan operation so that as many channels as possible in selectable channels are set in the slave connection device belonging to a same connection cluster.

What is claimed is:

1. A wireless communication device comprising:
a transmission and reception unit that performs communication using a wireless signal;
an advertise communication control unit that performs an advertising operation that broadcasts a message to a plurality of other devices via the transmission and reception unit, and a scan operation that receives the message broadcast by any of the plurality of other devices;
a connection communication control unit that performs a connection operation that communicates with a preset specific other device in a one-to-one communication via the transmission and reception unit; and
a message processing unit that processes the message to be transmitted and received via the transmission and reception unit, wherein the message processing unit transmits and receives the message using the connection communication control unit to another device in a connection cluster that can be communicated by the connection operation, and transmits and receives the message using the advertising communication control unit to another device outside the connection cluster when the advertising operation is permitted for its own device, and wherein the message processing unit, when transmitting the message generated by the own device, transmits the message to the another device in the connection cluster by the connection cluster by the connection operation, and transmits the message to the another device outside the connection cluster through the advertising communication control unit when the own device is a device for which the advertising operation is permitted in the connection cluster.

2. The wireless communication device according to claim 1, wherein the message processing unit, when receiving the message from the another device in the connection cluster or the another device outside the connection cluster, discards the received message in response to the message received being the same as the previously received message, and performs processing according to the received message in response to the message received being new and a destination of the received message being the own device, and transmits the received message to the another device in the connection cluster by the connection operation in response to the received message being new and the destination of the received message being the another device in the connection cluster, and transmits the received message to the another device outside the connection cluster by the advertising operation in response to the received message being new when the own device is a device for which the advertising operation is permitted in the connection cluster.

3. The wireless communication device according to claim 1, wherein the connection communication control unit comprises a connection setting storage unit that stores a connection setting value including information specifying the another device that performs communication by the connection operation.

4. The wireless communication device according to claim 3, wherein the connection setting value is information generated externally and is information distributed to the wireless communication device.

5. The wireless communication device according to claim 1, further comprising an advertising setting storage unit that stores an advertising setting value for setting whether the advertising communication control unit performs the advertising operation or not.

6. The wireless communication device according to claim 5, wherein the advertising setting value is generated externally and is distributed to the wireless communication device.

7. The wireless communication device according to claim 1, wherein the advertising communication control unit comprises a scan setting storage unit that stores a scan setting value specifying a channel to be used when the scan operation is performed.

8. The wireless communication device according to claim 1, wherein the message processing unit comprises:

a message duplication determination unit that discards a received message when it is determined that the received message is the same as a previously received message;

a message relay determination unit that instructs the advertising communication control unit and the connection communication control unit to forward the received message to the another device in the connection cluster and the another device outside the connection cluster when a destination of the received message includes the another device in the connection cluster and the another device outside the connection cluster; and a message destination determination unit that forwards the received message to a data processing unit in the own device when the destination of the received message includes the own device, when it is determined that the received message is different from a previously received message by the message duplication determination unit.

9. The wireless communication device according to claim 1, further comprising:

a communication means information generation unit that adds reception means information indicating whether the reception path of the message is through the advertising communication control unit or through the connection communication control unit to the message; and an advertising relay determination unit that refers to the reception means information when the message is transferred to the other device in the connection cluster and outside the connection cluster, and instructs the advertising communication control unit to transmit the message when the reception means information indicates the advertising communication control unit, and discards the transmission of the message when the reception means information indicates the connection communication control unit.

10. A communication system comprising a plurality of wireless communication devices that are installed in areas in which the plurality of wireless communication devices can communicate with each other using a wireless signal from its own device, each of the plurality of wireless communication devices comprising:

a transmission and reception unit that performs communication using a wireless signal;

an advertising communication control unit that performs an advertising operation that broadcasts a message to a plurality of unspecified other devices via the transmission and reception unit, and a scan operation that receives the message broadcast by any of the plurality of unspecified other devices;

a connection communication control unit that performs a connection operation that communicates with a preset specific other device in a one-to-one communication via the transmission and reception unit;

a connection setting storage unit that stores a connection setting value including information specifying the other device that communicates by the connection operation; and a message processing unit that processes the message to be transmitted and received via the transmission and reception unit, wherein each of the plurality of wireless communication devices belongs to any one of a plurality of connection clusters, and includes the connection setting value that specifying any one of the wireless communication devices as a master connection device in the connection cluster, and communicates with the master connection device, wherein one of the wireless communication devices in the connection cluster performs the advertising operation with respect to another connection cluster, and wherein the message processing unit, when transmitting the message generated by the own device, transmits the message to the other device in the connection cluster by the connection operation, and transmits the message to the other device outside the connection cluster by the advertising operation when the own device is a device for which the advertising operation is permitted in the connection cluster.

11. The communication system according to claim 10, wherein the message processing unit, when receiving the message from the other device in the connection cluster or outside the connection cluster, discards the received message in response to the message received being the same as the previously received message, and performs processing according to the received message in response to the message received being new and a destination of the received message being the own device, and transmits the received message to the other device in the connection cluster by the connection operation in response to the received message being new and the destination of the received message being the other device in the connection cluster, and transmits the received message to the other device outside the connection cluster by the advertising operation in response to the received message being new when the own device is a device for which the advertising operation is permitted in the connection cluster.

12. The communication system according to claim 10, wherein the message processing unit comprises:

a message duplication determination unit that discards a received message when it is determined that the received message is the same as a previously received message;

a message relay determination unit that instructs the advertising communication control unit and the connection communication control unit to forward the received message to the other device in the connection cluster and outside the connection cluster when a destination of the received message includes the other device in the connection cluster and outside the connection cluster; and a message destination determination unit that forwards the received message to a data processing unit in the own device when the destination of the received message includes the own device, when it is determined that the received message is different from a previously received message by the message duplication determination unit.

13. The communication system according to claim 10, wherein the wireless communication device further comprises:

a communication means information generation unit that adds reception means information indicating whether the reception path of the message is through the advertising communication control unit or through the connection communication control unit to the message; and an advertising relay determination unit that refers to the reception means information when the message is transferred to the other device in the connection cluster and outside the connection cluster, and instructs the advertising communication control unit to transmit the message when the reception means information indicates the advertising communication control unit, and discards the transmission of the message when the reception means information indicates the connection communication control unit.

14. A communication system according to claim 10, wherein one of the wireless communication devices in the connection cluster performs the scan operation on different channels in selectable channels.

15. The communication system according to claim 10, wherein the connection cluster includes a plurality of wireless communication devices located adjacent to each other at distances capable of communication by the connection operation.

* * * * *